Patented Oct. 12, 1926.

1,602,846

UNITED STATES PATENT OFFICE.

STEPHEN P. BURKE, OF NEW YORK, N. Y., ASSIGNOR TO RALPH H. McKEE, OF NEW YORK, N. Y.

PROCESS OF MAKING METHYL ALCOHOL.

No Drawing.  Application filed September 7, 1922. Serial No. 586,782.

This invention relates to the manufacture of methyl alcohol, and comprises a simple and effective process whereby methyl ether, for which there exists at present only a very limited commercial demand, may be transformed into methyl alcohol, for which there is an active present and prospective demand. While my process is of course applicable to tre conversion of methyl ether from whatever source, I will describe it in its application to the treatment of methyl ether or gaseous mixtures containing the same, prepared by the hydrolytic decomposition of methyl chlorid, as more fully disclosed in a copending application of Ralph H. McKee filed concurrently herewith.

In said application it is pointed out that methyl chlorid, or mixtures containing the same, subjected in conjunction with steam and at a sufficient temperature of the order of 350°-375° C. to the hydrolytic action of such hydroxids as those of calcium, barium magnesium and aluminium, yields methyl alcohol and methyl ether in relative proportions varying according to the conditions employed. The methyl alcohol, with some methyl ether may be recovered from the resulting gas mixture by scrubbing with water, and the bulk of the methyl ether may then be absorbed in heavy oil, from which it may be expelled by moderate heating.

According to the present invention I mix with methyl ether, prepared as above or by other method, or with gases containing methyl ether, a relatively large proportion of steam; and I bring the resulting mixture at an elevated temperature, preferably approximately 350°-375° C., into contact with aluminum oxid, or other refractory oxid or oxids of equivalent effect, contained in a tube or other convenient reactor presenting interior walls of aluminum or aluminum alloy. Under these conditions a proportion of the methyl ether, depending largely upon the proportion of steam used, is converted directly and without appreciable formation of by-products, into methyl alcohol. This latter may be scrubbed out of the cooled reaction mixture by means of water, and the residual methyl ether returned for re-working in cyclical flow.

I have found it desirable in practice to use several volumes, and advantageously 8-10 volumes of steam with each volume of methyl ether, under which last mentioned conditions about 50 percent of the methyl ether is converted to methyl alcohol at each passage through the reactor. Higher relative proportions of steam effect a larger conversion at each cycle, but the operating cost is increased. With substantially lower percentages of steam, the yield of the alcohol at each passage through the reactor is lessened, but a 30 percent conversion is obtainable with 3-4 volumes of steam. My invention therefore is not restricted to the use of steam in any specific proportions to the ether, although as above pointed out, relatively large proportions of steam are practically desirable.

Nor is my invention limited to the use of the specific temperatures mentioned, altho I regard these as most advantageous, having regard to the activity, regularity and general controllability of the reaction.

So far as I am aware the above described direct conversion of an ether to an alcohol by hydrolysis with steam is broadly new; but it is not applicable to all ethers, at least under the same conditions. For example, ethyl ether under similar conditions yields little or no alcohol, although some ethylene is formed.

While aluminum oxid is the most efficient agent of which I am aware for effecting this conversion, my invention is not limited to its use; since other refractory oxids, notably other oxids of the aluminum group, or mixtures or compounds of such oxids, such as clays, may perhaps be successfully used. The term "aluminum oxid" as used in the claims is to be regarded therefore as embracing the equivalents of this oxid for this reaction.

I claim:

1. Process of making methyl alcohol comprising effecting the direct hydrolysis of the corresponding ether, by the agency of steam, at an elevated temperature in the neighborhood of 350°-375° C., and in presence of a hydrolyzing agent having the essential properties of aluminum oxid.

2. Process according to claim 1, in which the methyl ether is admixed with approximately 8-10 volumes of steam.

3. In a process of making methyl alcohol, the steps comprising commingling methyl ether with several volumes of steam, and contacting the mixture at an elevated temperature in the neighborhood of 350°–375° C. with aluminum oxid.

4. A cyclical process of making methyl alcohol, comprising commingling methyl ether with several volumes of steam; contacting the mixture at an elevated temperature in the neighborhood of 350°–375° C. with a hydrolyzing agent having the essential properties of aluminum oxid, thereby converting a portion of the ether into alcohol; absorbing the alcohol; and returning the residual ether to the operating cycle to effect further conversion thereof.

In testimony whereof, I affix my signature.

STEPHEN P. BURKE.